H. A. OBERBECK.
HEARSE ATTACHMENT FOR AUTOMOBILES.
APPLICATION FILED DEC. 6, 1917.
1,290,776.
Patented Jan. 7, 1919.
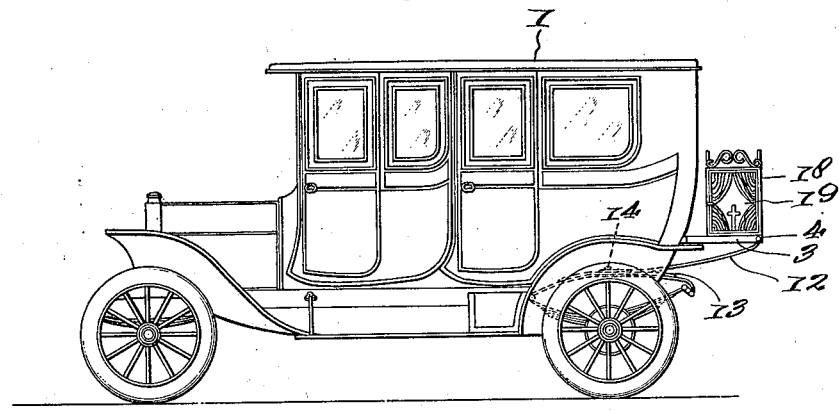
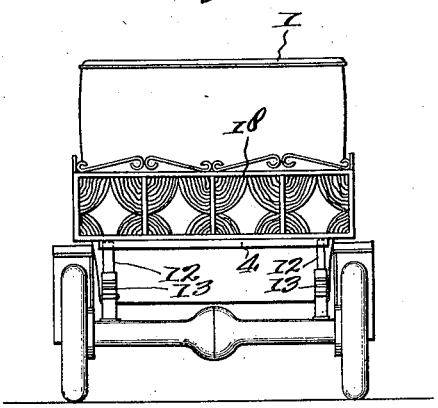
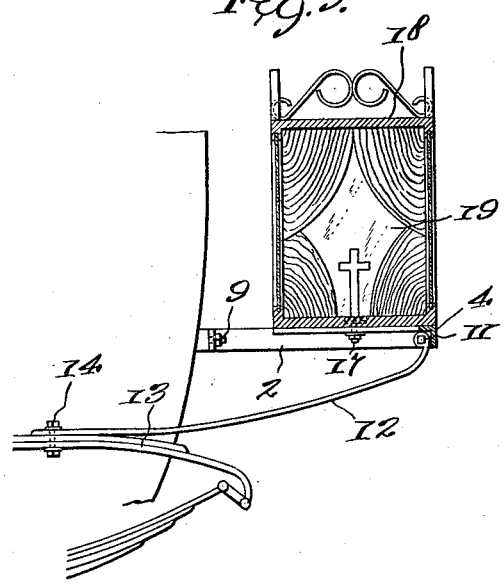
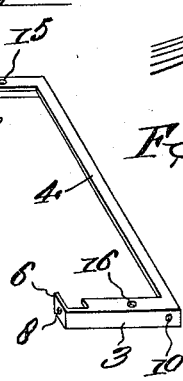
Witnesses
Edwin J Beller
R. J. Mawhinney
Inventor
Henry A. Oberbeck.
by Wilkinson & Giusta
Attorneys

UNITED STATES PATENT OFFICE.

HENRY A. OBERBECK, OF CHICAGO, ILLINOIS.

HEARSE ATTACHMENT FOR AUTOMOBILES.

1,290,776.
Specification of Letters Patent. Patented Jan. 7, 1919.

Application filed December 6, 1917. Serial No. 205,786.

*To all whom it may concern:*

Be it known that I, HENRY A. OBERBECK, a citizen of the United States, residing at Chicago, in the county of Cook and State of Illinois, have invented certain new and useful Improvements in Hearse Attachments for Automobiles; and I do hereby declare the following to be a full, clear, and exact description of the invention, such as will enable others skilled in the art to which it appertains to make and use the same.

The present invention relates to improvements in hearse attachments for automobiles in which there is involved no modification of the automobile body, but which consists in a removable attachment adapted to be placed at the rear of the automobile including a demountable casing wrought in ornamental design symbolic of its use, and which is arranged to receive a casket.

It is one object of the present invention to provide an attachment of the above character in which a supporting frame is permanently mounted on the back of the vehicle, and which is so constructed as to be useful in the capacity of a rear bumper when the casket-containing casing is removed and the vehicle employed for ordinary purposes.

In the accompanying drawings forming a part of this application, and in which similar reference symbols indicate corresponding parts in the several views:

Figure 1 is a side elevational view of an automobile equipped with my improved hearse attachment.

Fig. 2 is a rear view of the automobile, also showing the attachment in place.

Fig. 3 is a fragmentary side view of the automobile with the improved attachment shown in vertical section; and Fig. 4 is a perspective view of the metallic frame for supporting the casket casing.

Referring more particularly to the drawings, 1 designates an automobile, my improved attachment being preferably used in connection with a vehicle having a limousine body, as shown.

At the rear of the vehicle body I attach a frame, preferably made of angle iron of suitable dimensions and shaped to provide relatively short longitudinally-extending arms 2 and 3, and an elongated rear sill 4 extending between said arms 2 and 3 and running transversely. At their forward ends the arms 2 and 3 have their terminals 5 and 6 bent inwardly in opposite directions and at right angles, and such terminals are formed with perforations 7 and 8 to receive bolts 9 by which the frame is attached to the rear of the body of the automobile 1.

Additional perforations 10 are made in both of the arms 2 and 3, at their rear ends, to receive bolts 11, which hold the rear ends of spring braces 12 having their forward ends bolted or otherwise secured to the elliptical rear springs 13, or other part of the vehicle. The bolt 14, illustrated in Fig. 3, shows one convenient method by which this arrangement may be made.

The openings 15 and 16 in the horizontally-extending portions of the arms 2 and 3 admit bolts 17 by which a casing 18 is demountably attached to the metallic frame. The casing 18 preferably takes up the position shown in Figs. 1 and 2.

The design illustrated in the drawings is intended to represent any ornamental design that will be symbolic of the use to which this casing is to be put. One or more ends of the casing 18 are closed by doors 19 which permit of access to the interior for placing the casket therein and removing it therefrom, and for the purposes of receiving this casket the casing 18 is preferably supplied with the usual hearse platform.

When in use as a hearse, the casing is mounted in the position shown in Fig. 1, and is held securely on the frame by the bolts 17. The spring braces 12 are provided for absorbing any shocks or jars incident to traveling which may be transmitted through the elliptical springs of the vehicle.

The vehicle may be used for ordinary purposes by removing the bolts 17 and demounting the casing 18, whereupon the metallic supporting frame will present the appearance and fulfil the functions of a rear bumper.

I am aware that casket-containing compartments have been heretofore provided for vehicles, but to my knowledge no casing for this purpose has been removably mounted on the rear of a vehicle in the manner and by the means above described.

It is obvious that those skilled in the art may vary the details of construction and arrangements of parts without departing from the spirit of my invention, and therefore I do not wish to be limited to such features except as may be required by the claims.

I claim:

1. The combination with a vehicle, of a frame composed of short arms extending longitudinally of the vehicle, a transverse sill connecting the rear ends of said short arms, the forward ends of said short arms being unconnected and having their extremities bent inwardly and perforated, fastening means passing through the perforations in said bent extremities whereby to hold the frame on the rear end of the vehicle, and spring braces having their rear ends attached to the rear ends of said short arms and extending downwardly and forwardly, the front ends of said spring braces being secured to the rear vehicle springs, substantially as described.

2. The combination with an automobile, of a frame composed of short longitudinally extending arms, a transverse sill connected between the rear ends of said arms, and being formed in one piece therewith, the forward ends of said arms being unconnected and having inwardly bent extremities provided with perforations, bolts passing through said perforations whereby the frame may be held on the rear end of the automobile body, flanges carried by said arms and having perforations therein, fastening means passing through the perforations in said flanges to hold a casing thereon, said arms having perforations at their rear ends, braces adapted to be connected between said frame and the rear vehicle springs and extending downwardly and forwardly from the rear end of said frame, fastening means for securing the rear ends of said braces, said fastening means passing through the perforations in said short arms, and fastening means whereby the forward ends of said braces as connected to said vehicle springs, substantially as described.

3. The combination with an automobile, of a frame composed of short longitudinal extending arms of angle iron construction, a transverse sill also of angle iron construction and connecting the rear ends of said arms and being in one piece therewith, the forward ends of said arms being unconnected and having their extremities bent at right angles inwardly, the extremities being perforated, fastening means passing through the perforations in said extremities whereby the frame may be attached to the rear of the automobile body, curved strong spring braces connected between the rear ends of said short arms and the rear vehicle springs, the frame being arranged to receive a casing and having perforations adapted to receive fastening means whereby the casing may be held on the frame, substantially as described.

In testimony whereof I affix my signature.

HENRY A. OBERBECK.

Copies of this patent may be obtained for five cents each, by addressing the "Commissioner of Patents, Washington, D. C."